United States Patent

[11] 3,544,091

| [72] | Inventors | Friedrich Jaeger<br>Bad Hersfeld;<br>Johannes Holzner, Erlenbach, Germany |
|---|---|---|
| [21] | Appl. No. | 814,625 |
| [22] | Filed | April 9, 1969 |
| [45] | Patented | Dec. 1, 1970 |
| [73] | Assignee | Glanzstoff AG<br>Wuppertal, Germany |
| [32] | Priority | April 13, 1968 |
| [33] | | Germany |
| [31] | | No. 1,751,164 |

[54] APPARATUS FOR CONTINUOUS THERMAL TREATMENT OF POURABLE GRANULES
10 Claims, 7 Drawing Figs.

[52] U.S. Cl. .................................................. 263/30
[51] Int. Cl. .................................................. F27b 1/10
[50] Field of Search .......................................... 263/30, 4; 34/10, 57

[56] References Cited
UNITED STATES PATENTS
| 2,933,297 | 4/1960 | Erasmus et al............... | 263/30 |
| 3,356,351 | 12/1967 | Roberts et al................ | 263/30 |

*Primary Examiner*—John J. Camby
*Attorney*—Johnston, Root, O'Keeffe, Keil, Thompson and Shurtleff ABSTRACT: Apparatus for the continuous thermal treatment of a pourable or flowing granular material, especially granules of a thermoplastic polymer, including a vertically positioned vessel of rectangular cross section enclosing in sequence from top to bottom (a) at least one thermal treatment zone arranged above a lowermost horizontal heat exchange means, (b) a stabilizing zone of the same cross section as the thermal treatment zone or zones thereabove, and (c) a discharge zone of unidimensionally narrowing rectangular cross section. The specific dimensions of the apparatus are dependent upon the angle of slide of the pourable granular material being treated.

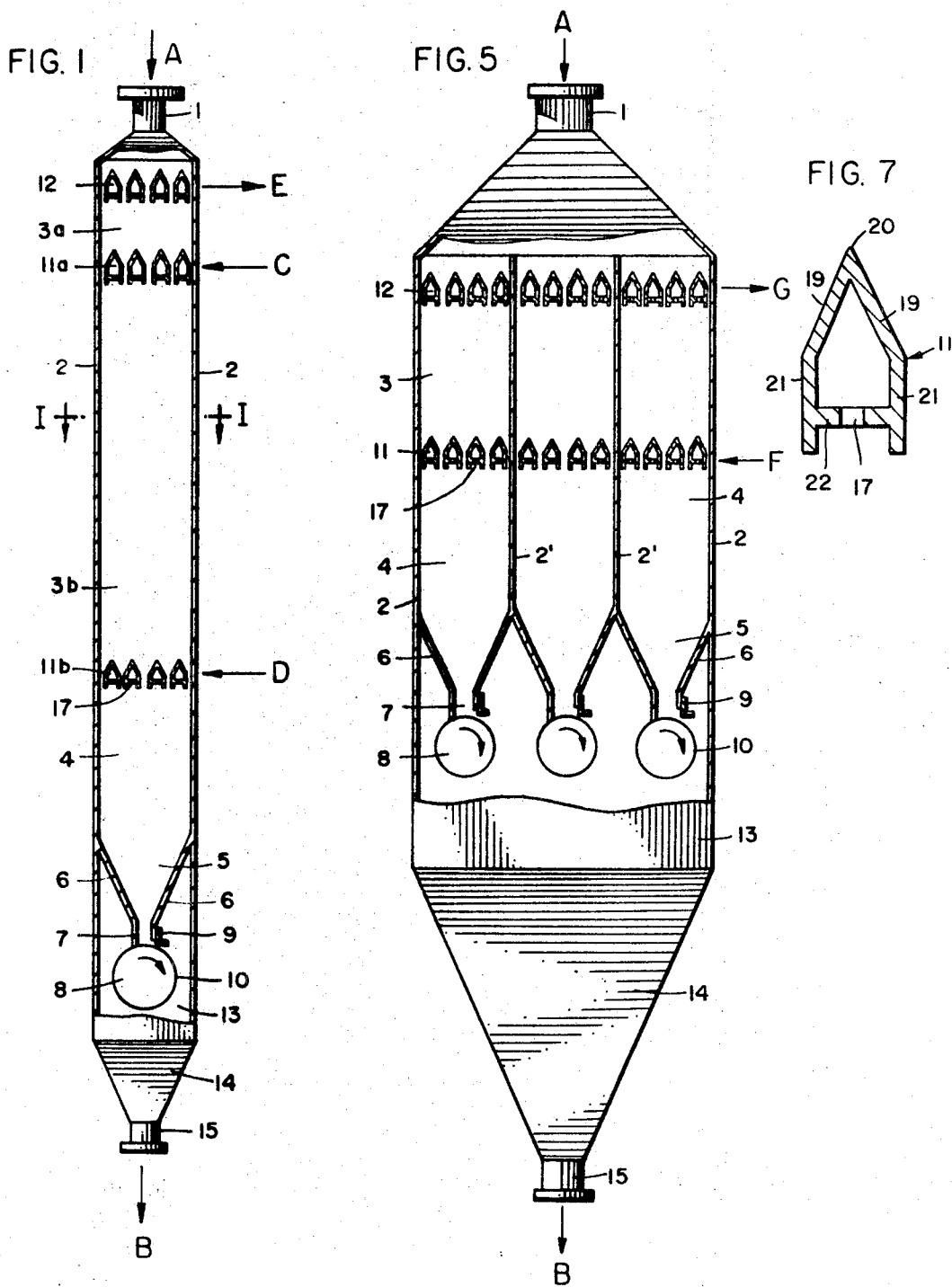

FIG. 3
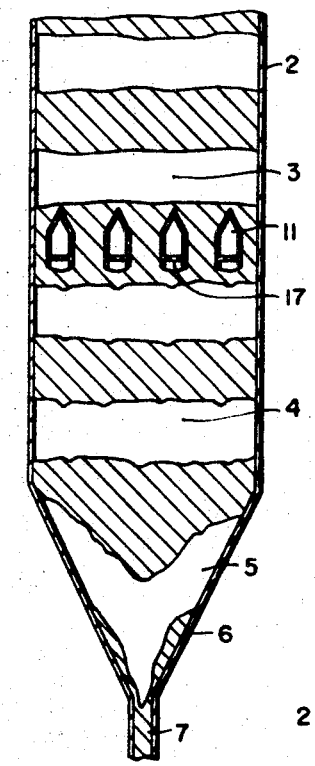
FIG. 4
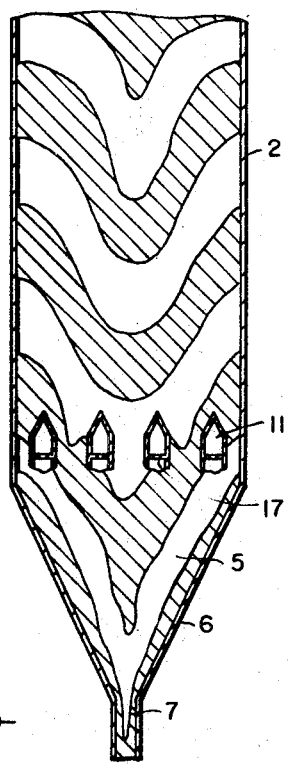
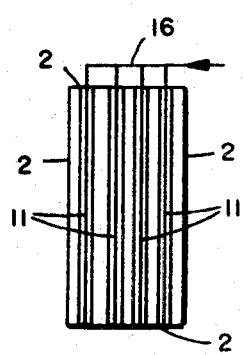
FIG. 2
INVENTORS:
FRIEDRICH JAEGER
JOHANNES HOLZNER

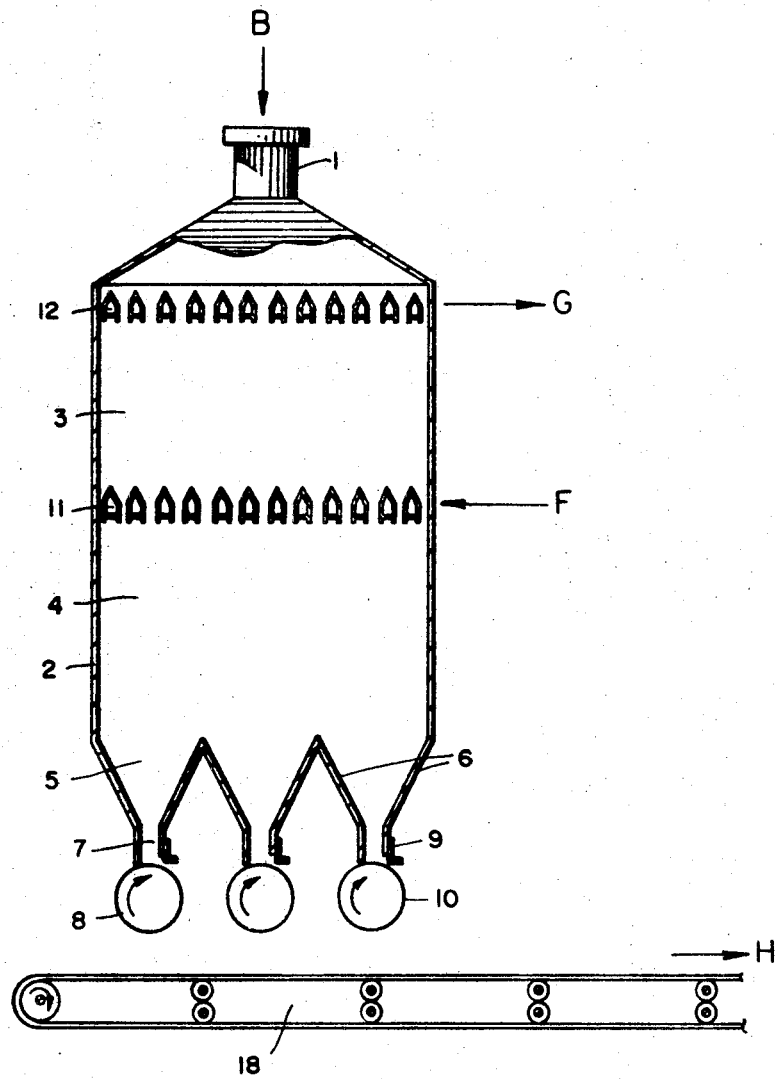

APPARATUS FOR CONTINUOUS THERMAL TREATMENT OF POURABLE GRANULES

The term "pourable granular material" is applied to particles or granules of a wide variety of substances which exhibit a substantially uniform particle or grain size and are normally resistant toward adhesion, i.e. there is no overbalancing of adhesive forces inherent in the particles themselves which would lead to uncontrollable agglomeration or thermal grain growth. For purposes of the present disclosure, all particles or granulates may be considered as falling within the expression "pourable granular material" as described and defined in the periodical "Chemie-Ingenieur-Tecknik", Vol. 30, 1958. No. 3, pages 144 to 146.

The term "thermal treatment" is employed herein to include both direct and indirect heat exchange with the pourable granular material, and there may also be a material exchange as when a gaseous or vaporous medium is conducted countercurrently in direct heat exchange with the pourable granular material.

In the continuous thermal treatment of granular materials which are especially temperature sensitive, e.g. with many thermoplastic materials, it is of primary importance to provide as short as possible periods of residence time of the individual particles as they pass through the individual treatment zones. In the ideal case, all particles should have the same residence time. However, this ideal case can only be achieved to the extent that one is successful in providing a coherent uniform stream, i.e. a flow of the particles in essentially one direction with a constant velocity of flow of all particles over any given cross section transverse to the direction of flow.

Previously known vertical shaft driers or similar heat exchange apparatus for the thermal treatment of granular materials do not fulfill this requirement of a substantially uniform residence time. Even with the installation of numerous dividers, deflectors or baffles, there is invariably too great a variation in the residence time of the individual particles because those particles located directly above the exit or discharge opening flow through the apparatus much more rapidly than those particles located along the outer walls. Such variations in the residence time, e.g. in the drying or heat treatment of thermoplastic particles, result in localized overheating and a sticking together or agglomeration of the particles. Such agglomeration can cause the apparatus to become plugged and overheating can cause serious thermal damage to the material being treated so that it becomes useless in its intended applications.

It is an object of the present invention to provide an apparatus for the continuous thermal treatment of a pourable granular material in which the residence time of the individual particles or granules is maintained within especially narrow limits over the entire height of a thermal treatment zone.

Another object of the invention is to provide such apparatus in which thermally sensitive particles will not agglomerate or tend to form solid bridges, e.g. across a discharge outlet, causing a plugging or stopping up of the apparatus. At the same time, it is an object of the invention to avoid or suppress local overheating and thermal damage of the particles being treated.

Yet another object of the invention is to provide an apparatus capable of continuously treating a large volume or throughput of pourable granular material, i.e. by optionally increasing the cross-sectional dimensions of the apparatus or by adding units in adjacent relationship while still permitting an accurate regulation of the uniform flow and discharge rates of the particles.

These and other objects and advantages of the invention will become more apparent after considering the following detailed description together with the accompanying drawings.

It has now been found, in accordance with the invention, that highly improved results can be achieved in the continuous thermal treatment of a pourable granular material, provided that one employs an apparatus in the form of an elongated vertically positioned vessel of rectangular cross section with a specific construction and arrangement of individual parts or elements which are directly and critically dependent upon the angle of slide of the granular material being treated.

Thus, the apparatus of the invention essentially includes an elongated vertically positioned vessel of rectangular cross section, said vessel having feed means at the upper end thereof for the introduction of said granular material and having discharge means at the lower end thereof including a discharge zone of unidimensionally narrowing rectangular cross section as defined by two symmetrically converging, oppositely disposed wall sections of the vessel and means to regulate the discharge rate of the granular material, the angle of aperture between said converging wall sections being smaller than 0.8 times the difference between 180° and twice the angle of slide of the granular material being treated; at least one thermal treatment zone arranged in an upper portion of said vessel, said thermal treatment zone being defined at its bottom by a set of horizontally arranged heat exchange elements uniformly spaced from one another and shaped to permit a uniform downward flow of granular material thereover and being defined at its sides by vertical walls, all such thermal treatment zones having the same rectangular cross section throughout their vertical length; and a stabilizing zone arranged between the lowermost thermal treatment zone and said discharge zone, said stabilizing zone being defined on its sides by said vertical walls and having the same rectangular cross-sectional dimensions as said at least one thermal treatment zone located thereabove, the vertical height of said stabilizing zone being greater than the product of its width and the tangent of the angle of slide of the granular material being treated.

conically shaped term "angle of slide" has reference to the granular material being treated and is sometimes referred to as the "angle of slope" or "pour angle" which is formed by pouring slide" conically shaped mass of particles in which the individual particles freely slide or fall down the outer surface of the cone, the angle being measured between this conical surface and the horizontal. The "angle of slide" may also be defined as the angle of minimum slope, measured from the horizontal, at which any pourable granular material or similar loose solid will flow.

The term "angle of aperture" has reference to the fact that the two converging walls of the discharge zone are not joined at the bottom but terminate to form an aperture in the form of an elongated exit slot which is preferably combined with means to regulate the discharge of the granular material therethrough e.g. a movable gate or door which permits the effective width of this slot to be varied. For purposes of definition herein, the "width" or "breadth" of the different zones in the vessel are measured in the direction in which the rectangular cross section of the discharge zone is narrowed by its converging walls. The "length" or "depth" of the rectangular vessel is then measured in the longitudinal direction of the exit slot, and the "height" of the vessel or individual zones therein are measured in the vertical direction.

In order to provide a thermal treatment vessel of adequate size and throughput while maintaining a uniform flow and residence time of the individual particles of granular material, it is essential to construct the vessel with a rectangular cross section throughout its vertical height and with a unidimensionally narrowing rectangular cross section at the lower end towards the discharge opening. In the thermal treatment and stabilizing zones, the sidewalls of the vessel must be arranged vertically so that all of these zones have the same cross-sectional dimensions, i.e. a uniform width and length. The discharge zone has the same cross-sectional dimension of length as the treatment and stabilizing zones since it is narrowed only in the direction of its width by the two converging or inwardly slanting wall sections. Therefore, the two vertical walls of the vessel which define its length or depth can extend over the entire vertical height of the vessel.

The length or depth of the vessel corresponding to the length of the discharge or exit slot can be chosen within very broad limits since there is no critical effect in this direction on the flow characteristics of the granular material being treated. On the other hand, the width or breadth of the vessel (i.e. transverse to the longitudinal direction of the exit slot) might appear to be limited in achieving a uniform flow of the granular material. But in fact, this width of the vessel itself is also optional since it is possible to arrange a plurality of treatment zones and their associated stabilizing zones side by side in the direction of their width, with or without a partition formed by a common vertical wall separating the adjacent vertical zones, provided that a separate discharge zone is arranged below each individual thermal treatment zone and its associated stabilizing zone. In all cases, the maximum width of the discharge zone, which in turn corresponds to the width of the individual stabilizing zone and thermal treatment zone or zones thereabove, should be at least 10 times the width of the exit slot of the discharge zone. In other words, the ratio of the width of the exit slot to the width of the thermal treatment and stabilizing zones arranged thereabove is less than a value of about 0.1, and the number of adjacent treatment and stabilizing zones contained in a vessel of any given width is essentially based upon the number of discharge zones required within the limits dictated by the angle of slide of the granular material being treated.

The inlet or feed means for the granular material at the upper end of the vessel should preferably be constructed and arranged to provide a relatively uniform distribution of the particles over the cross section of the vessel. This can be easily accomplished with any number of well-known feed and distributing devices, e.g. with suitable baffles, chutes, funneling distributors, or the like.

As the granular material passes through one or more thermal treatment zones, it can be subjected to a heating or even a cooling effect by the suitable installation of horizontally positioned heat exchange elements which are preferably identical hollow tubular members arranged parallel to one another and spaced uniformly across the treatment zone at appropriate vertical locations. These heat exchange elements should be shaped to permit a uniform downward flow of granular material thereover.

Since it is especially desirable to thermally treat many granular materials by direct heat exchange with a gaseous medium, the heat exchange elements are advantageously designed as a grid of horizontally extending elongated tubes or gas conduits with means to feed the gaseous medium therethrough for uniform introduction into the vessel. These tubes preferably extend lengthwise of the rectangular cross section of the treatment zone and can be in fluid connection with a common manifold or gas supply line. Means must also be provided for withdrawing the gas near the top of the uppermost treatment zone in the vessel, e.g. at a short distance below the top surface of the granular material contained in the vessel. These means may also include a grid-shaped horizontal arrangement of hollow tubular members apertured on their lower wall surface and having the same shape and parallel arrangement as the heat exchange members. These gas collecting tubes can then be connected with a common gas withdrawal or discharge conduit.

In a particularly preferred embodiment of the apparatus according to the invention, each heat exchange element and preferably each gas collecting tube is a multi walled profiled tube symmetrical about a vertical plane passing through its longitudinal axis, the tube having planar side walls diverging downwardly to form a top ridge in said vertical plane and having a bottom wall apertured for the injection of a gas from the heat exchange element or for collecting the gas by the gas collecting tube. These tubes thus may have a roof-shaped or house-shaped structure, e.g. as defined by said diverging upper sidewalls which can be joined with vertical lower sidewalls and a bottom apertured wall. The angle of divergence of the upper sidewalls should be chosen so as to be smaller than 0.8 times the difference between 180° and twice the angle of slide of the granular material, thereby avoiding any excessive buildup or delayed retention of the particles as they pass downwardly around these tubes.

Similar heating or cooling elements may be installed as horizontal inserts at various locations in the vertical thermal treatment zone, i.e. to provide several heat exchange zones or to provide a supplemental heating or cooling by direct or indirect heat exchange. The overall thermal treatment is then bounded at its lowest point in the vessel by the lower most of two or more horizontal heat exchange means.

In order to achieve a substantially uniform residence time of the granular material in the individual thermal treatment zones, i.e. an approximately equal flow velocity of all particles in a coherent stream traversing a horizontal cross section, it is essential to "stabilize" this flow in the treatment zones. Such stabilization requires a very precise and critical geometrical arrangement of those portions of the vessel arranged below the one or more treatment zones, i.e. below the lowermost insert for gas injection or indirect heat exchange. Thus, the angle of aperture of the converging wall sections of the discharge zone should not exceed a certain value so that the pourable granular material will tend to flow continuously through the discharge zone. The desired flow characteristics at this point will take place provided that this angle of aperture is smaller than 0.8 times the difference between 180° and twice the angle of slide of the granular material.

Furthermore, stabilization of flow in the thermal treatment zones can only be guaranteed by providing a so-called "stabilizing zone" between the lowermost heat exchange insert and THE discharge zone. This stabilizing zone is completely free of the inserts including baffles or other flow-impeding elements, so as to provide a completely open cross section having the same cross-sectional dimensions as formed by the vertical sidewalls surrounding the thermal treatment zones located directly thereabove. Also, this stabilization zone must have a height which is at least as large as the product of its width, i.e. measured transversely to the discharge or exit slot, and the tangent of the angle of slide of the granular material being treated.

By carefully observing all of the required limitations as to the shape and structure of the vessel and the individual zones contained therein, one can achieve the desired stabilization with a very wide variety of granulated materials. In most instances and especially with various thermoplastic granulated materials, it has been found desirable to limit the width of the individual thermal treatment zones to a value of less than 1500 mm. Especially good results have been achieved with a width of approximately 500 mm., e.g. from 400 to 600 mm. Under these conditions, the width of the exit slot normally should not exceed 150 mm. and is preferably about 40 to 60 mm. In this connection, it should be noted that the exit slot can be partially or completely closed in regulating the flow of material so that this width of the exit slot has reference to the maximum effective width of the slot during operation of the apparatus.

All of the elements of the invention favor a partially blocked or regulated flow of granular material through the apparatus whereby local overheating or inadequate and nonuniform thermal treatment of the individual particles can be avoided. At the same time, no limits are placed on the total volume of material which can be treated in a single vessel wherein the heating or cooling effect can be applied uniformly over the entire cross section of the vessel.

The apparatus of the invention is further illustrated by way of specific preferred embodiments as set forth in the accompanying drawings wherein:

FIG. 1 is a cross-sectional view taken on a vertical plane across the width of a single vertical thermal treatment unit according to the invention, the upper and lower ends of the complete vessel being partially enclosed;

FIG. 2 is a cross-sectional view of the apparatus shown in FIG. 1 taken on the line I-I so as to illustrate the arrangement of a number of the parallel and horizontally arranged heat exchange tubes;

FIGS. 3 and 4 provide an enlarged and partially schematic view of that portion of the apparatus which includes a portion of the thermal treatment zone and all of the discharge zone, the stabilizing zone being present in FIG. 3 but omitted from FIG. 4 to illustrate the effect of this zone on the flow of the granular material;

FIG. 5 is a vertical sectional view similar to FIG. 1 but illustrating an apparatus of greater capacity with a plurality of treatment and stabilizing zones arranged side by side and with a corresponding plurality of discharge zones;

FIG. 6 is a vertical sectional and partly schematic view similar to FIG. 5 but in which vertical partitions or separating walls within the vessel have been omitted and in which a conveyor belt is further included below the vertical vessel; and FIG. 7 is a cross-sectional view of one of the heat exchange or gas collecting tubes arranged in horizontal positions within the vessel.

The same reference numerals are used in each of the figures of the drawings to designate similar parts, and it should be understood that the relative size of certain elements such as the heat exchange tubes has been exaggerated for purposes of illustration.

The embodiment of the device according to the invention illustrated in FIG. 1 essentially includes a feed opening 1 through which the granular material is continuously introduced in the direction of the arrow A and can be conventionally distributed over the cross section of the rectangular vessel by a suitable distributing device (not illustrated). The vessel has four vertically positioned walls 2 which together enclose at least one and especially two treatment zones 3a and 3b (as shown in FIG. 1) and a zone 4 for stabilizing the granular stream. Finally, the vessel has a discharge zone 5 which is bounded or defined at the front and rear by two vertically positioned walls 2 and at the sides by two slanted converging walls 6, the vessel terminating at the bottom in an exit or discharge slot 7 under which a discharge device 8 serves to continuously discharge the thermally treated material. The discharge device 8 shown in FIG. 1 is a rotating discharge roller or drum, and the amount of treated material being withdrawn can be regulated by changing the rate of revolution of the roller or also by varying the width of the discharge slot between an adjustable plate or gate 9 and the surface 10 of the roller. In place of the discharge drum 8, there can also be provided other known discharge devices such as conveyor belts, bucket wheels, vibrating or shaking chutes and the like, insofar as these are suitable to guarantee a controlled discharge and after shaking of the pourable granulated material within the device and to uniformly drawn off the material over the height of the vertically walled discharge slot 7.

Both of the treatment zones 3a and 3b are bounded above and below by the gas inlet components 11 or the gas removal components 12. The height of the individual treatment zones 3a and 3b is determined by the time required for thermal treatment in each case. The height of zone 4, i.e. the interval between the lowermost gas inlet means 11b and the discharge zone 5, must be greater than the product of the breadth of this zone 4 and the tangent of the angle of slide of the material being treated.

The device illustrated in FIG. 1 is suitable for the thermal treatment of all pourable, granulated materials as defined hereinabove. It can be employed for example for the thermal treatment of a polyethylene terephthalate granulate having a particle size of 2×3×4 mm³. Such a granulate has an angle of slide of approximately 40°. Nitrogen heated to different temperatures is introduced through lines C and D into the apparatus and the gas is then drawn off through the exit line E by means of the gas removal members 12.

Since polyethylene terephthalate granules exhibit a sensitivity to atmospheric oxygen at high temperatures, the perpendicular walls 2 of the device extend beyond the zone 4 so that they form an airlocked or airproof bunker or collecting zone 13 from which the granules are passed through the funnel 14 and a discharge tube 15 in the direction of the arrow B into a dry bunker filled with an inert gas, e.g. nitrogen.

FIG. 2 provides a cross-sectional view downwardly into the apparatus of the invention along line I-I of FIG. 1 in order to show the rectangular shape of the walls of the apparatus in the treatment zones and to illustrate the position or arrangement of the gas inlet or heat exchange tubes 11b. The gas is conducted at D through the distributor pipe 16 into the gas inlet tubes 11b wherein the gas is injected into the apparatus through openings 17 in a conventional manner so as to come in direct contact with the granulated material.

FIGS. 3 and 4 are intended to illustrate how the granular material will flow either with or without the stabilizing zone 4, respectively. Thus, if each of the two devices are filled in a corresponding manner with alternating layers of white and colored plastic granules, using equal amounts of granulated material in each layer to provide a uniform stratification in the vertical direction, then by providing the front wall of the device with a transparent plastic window or making the entire wall transparent, it is possible to see the actual distribution of the flowing granules as shown in FIGS. 3 and 4 by the open and shaded portions. While the flow of the granules is stabilized in FIG. 3 by the baffle-free stabilizing zone 4 so that the stratified layers remain coherent and flow uniformly downwardly above the gas inlet members 11, a very different result occurs in FIG. 4 where the stabilizing zone is omitted. In this latter case, the flow of the granules is extremely nonuniform over the cross section even at points high above the gas inlet members.

FIG. 5 illustrates how several devices according to the invention can be combined. This combination makes clear immediately the possibility of providing an optimum utilization of space, but it also further shows how the cost of the apparatus with several elements or treatment zones built together can be reduced by means of a common feed of the granules and a common discharge or outlet. Thus, the embodiment illustrated in FIG. 5 is one in which the granules pass through only one thermal treatment zone 3, but three such treatment zones are arranged side by side. The gas employed for the thermal treatment is introduced through line F to supply all of the gas inlet members 11 across the entire vessel, i.e. in each of the adjacent treatment zones. In a similar manner, the effluent gas is withdrawn through a single discharge conduit G. While the outer walls 2 can be extended beyond the zone 4 to form an airlocked bunker or airproof collecting zone 13, the inner walls 2' extend only to the lower end of the zone 4, i.e. up to the beginning of the discharge zone 5. The remaining elements of the apparatus shown in FIG. 5 correspond to the same elements shown in FIG. 1 and are identified by the same reference numerals.

Still another embodiment of the apparatus is illustrated in FIG. 6 and likewise has only a single thermal treatment zone 3. The granulated material in this case is supplied continuously through the feed opening 1 and is continuously withdrawn over a series of three rotating drums 8 as discharge devices. The treated material is collected from the several drums 8 onto a conveyor belt 18 and transported away in the direction H. Again the treatment gas enters through line F and exits through line G, and the remaining elements generally correspond to those illustrated in FIG. 5.

The apparatus of FIG. 6 shows that it is possible to eliminate the inner walls 2' as shown in FIG. 5 so as to provide several adjacently positioned treating and stabilizing zones operating side by side in one completely open vessel, i.e. across its entire width. This can be accomplished without losing the stabilization of the granulate streams, provided that the interval between the lowermost gas inlet means 11 and the discharge zone 5, i.e. the height of the stabilizing zone 4, is chosen so as to be somewhat larger than is the case where the inner walls 2' are present as in FIG. 5. For the determination of the height of the stabilizing zone according to the prescribed limitation of a height at least as great as the product of the width of the treatment zone and the tangent of the angle of slide, it is necessary in both FIGS. 5 and 6 to consider this width of the treatment zone as being identical to the width of the individual discharge zones 5 at their broadest dimension, i.e. at the top thereof.

In FIG. 7, there is provided an enlarged view of a cross section taken perpendicularly to the longitudinal axis of an individual heat exchange tube 11 provided with a gas outlet opening or series of openings 17 along the bottom side thereof. The gas collecting tubes 12 can have the same cross-sectional structure, the gas being withdrawn through the openings 17. The house-shaped structure of these multiwalled tubes is defined by the top or slanting sidewalls 19 which are arranged at the same angle with a vertical plane passing through the ridge 20 and the longitudinal axis of the tube. Sidewalls 21 then extend vertically downwardly while a recessed bottom wall or floor 22 contains the opening or openings 17 for the gas stream. Many other suitable shapes or arrangements are possible, provided that they do not prevent the substantially uniform flow of granular material in the vessel.

Other variations in construction and assembly which do not affect the novel and critical features of the invention can be readily adopted by one skilled in this art.

We claim:

1. An apparatus for the continuous thermal treatment of a pourable granular material which comprises:
    an elongated, vertically positioned vessel of rectangular cross section said vessel having feed means at the upper end thereof for the introduction of said granular material and having discharge means at the lower end thereof including a discharge zone of unidimensionally narrowing rectangular cross section as defined by two symmetrically converging, oppositely disposed wall sections of the vessel and means to regulate the discharge rate of the granular material, the angle of aperture between said converging wall sections being smaller than 0.8 times the difference between 180° and twice the angle of slide of the granular material being treated;
    at least one thermal treatment zone arranged in an upper portion of said vessel, said thermal treatment zone being defined at its bottom by a set of horizontally arranged heat exchange elements uniformly spaced from one another and shaped to permit a uniform downward flow of granular material thereover and being defined at its sides by vertical walls, all such thermal treatment zones having the same rectangular cross section throughout their vertical length; and
    a stabilizing zone arranged between the lowermost thermal treatment zone and said discharge zone, said stabilizing zone being defined on its sides by said vertical walls and having the same rectangular cross-sectional dimensions as said at least one thermal treatment zone located thereabove, the vertical height of said stabilizing zone being greater than the product of its width and the tangent of the angle of slide of the granular material being treated.

2. An apparatus as claimed in claim 1 wherein said heat exchange elements are identical hollow tubular members parallel to one another with means to feed a gaseous medium therethrough for uniform introduction into said vessel and wherein a gas collecting and withdrawal means is arranged at the top of the uppermost thermal treatment zone.

3. An apparatus as claimed in claim 2 wherein each heat exchange element is a multiwalled profiled tube symmetrical about a vertical plane passing through its longitudinal axis, said tube having planar side walls diverging downwardly to form a top ridge in said vertical plane and having a bottom wall apertured for the injection of a gas from said tube into said vessel.

4. An apparatus as claimed in claim 3 wherein said gas collecting and withdrawal means includes a plurality of multiwalled profiled tubes having substantially the same shape and parallel arrangement as said heat exchange elements and located horizontally a short distance below the top surface of the granulated material being treated in said vessel.

5. An apparatus as claimed in claim 4 wherein the diverging side walls of each of said profiled tubes exhibits an angle of divergence therebetween which is smaller than 0.8 times the difference between 180° and twice the angle of slide of the granular material being treated.

6. An apparatus as claimed in claim 1 wherein the width of the thermal treatment and stabilizing zones is smaller than 1500 mm.

7. An apparatus as claimed in claim 1 wherein said discharge zone terminates at its bottom end with an exit slot for the withdrawal of said granular material from the vessel, and the ratio of the width of said slot to the width of said thermal treatment and stabilizing zones is less than 0.1.

8. An apparatus as claimed in claim 1 wherein said vessel includes an airtight storage chamber arranged below said discharge zone for temporary retention of the treated and discharged granular material.

9. An apparatus as claimed in claim 1 wherein a plurality of vertically positioned thermal treatment zones and their associated stabilizing zones width, arranged side by side in the direction of their width, a separate discharge zone being arranged below each individual thermal treatment zone and its associated stabilizing zone.

10. An apparatus as claimed in claim 9 wherein a common vertical wall separates each thermal treatment zone and its associated stabilizing zone from the next adjacent thermal treatment zone and its associated stabilizing zone.